(12) United States Patent
Klinstein et al.

(10) Patent No.: US 8,245,748 B2
(45) Date of Patent: Aug. 21, 2012

(54) VIBRATION WELDING SYSTEM

(75) Inventors: Leo Klinstein, Glenview, IL (US); Eugene Palatnik, Pewaukee, WI (US)

(73) Assignee: Dukane Corporation, St. Charles, IL (US)

( * ) Notice: Subject to any disclaimer, the term of this patent is extended or adjusted under 35 U.S.C. 154(b) by 89 days.

(21) Appl. No.: 12/835,781

(22) Filed: Jul. 14, 2010

(65) Prior Publication Data
US 2012/0012240 A1    Jan. 19, 2012

(51) Int. Cl.
*B32B 41/00*    (2006.01)

(52) U.S. Cl. ........ 156/351; 156/366; 156/367; 156/368; 156/378; 156/379

(58) Field of Classification Search ................. 156/351, 156/366, 367, 368, 378, 379, 580.1, 580.2, 156/73.1, 73.5, 73.6; 228/1.1, 110.1, 262
See application file for complete search history.

(56) References Cited

U.S. PATENT DOCUMENTS

| | | | |
|---|---|---|---|
| 4,179,059 A | 12/1979 | Chang et al. | 228/103 |
| 4,333,791 A | 6/1982 | Onishi | 156/580 |
| 4,496,095 A | 1/1985 | Renshaw et al. | 228/102 |
| 4,713,131 A | 12/1987 | Obeda | 156/73.1 |
| 4,750,970 A | 6/1988 | Malosh | 156/580 |
| RE33,063 E | 9/1989 | Obeda | 153/73.1 |
| 4,936,502 A | 6/1990 | Schlarb et al. | 228/102 |
| 4,975,133 A | 12/1990 | Gochermann | 156/73 |
| 5,295,700 A | 3/1994 | Crews et al. | 279/5 |
| 5,329,750 A | 7/1994 | Bagley et al. | 53/559 |
| 5,378,951 A | 1/1995 | Snyder | 310/17 |
| 5,491,372 A | 2/1996 | Erhart | 310/80 |
| 5,557,154 A | 9/1996 | Erhart | 310/80 |
| 5,562,242 A | 10/1996 | Manzo et al. | 228/2.1 |
| 5,706,627 A | 1/1998 | Kirka et al. | 53/52 |
| 5,707,414 A | 1/1998 | Leidy | 65/158 |
| 5,749,987 A | 5/1998 | Wannebo | 156/64 |

(Continued)

FOREIGN PATENT DOCUMENTS

DE    4120245    1/1992

(Continued)

OTHER PUBLICATIONS

PCT International Search Report for International Application No. PCT/US2007/011011 dated Feb. 28, 2008.

*Primary Examiner* — George Koch
(74) *Attorney, Agent, or Firm* — Nixon Peabody LLP

(57) ABSTRACT

A vibration welding system has a pair of electromagnets coupled to a first workpiece support for effecting reciprocating movement of the first workpiece support relative to a second workpiece support, and an electrical drive system coupled to the electromagnets for successively energizing and de-energizing the electromagnets out of phase with each other to effect the reciprocating movement of the first workpiece support. The drive system includes a source of DC current; multiple controllable electronic switching devices for controllably coupling the source to, and de-coupling the source from, each of the electromagnets; current sensors coupled to the electromagnets and producing signals representing the currents supplied to the electromagnets; and control circuitry coupled to the electronic switching devices and receiving the signals produced by the current sensors for turning the switching devices on and off to control the energizing and de-energizing of the electromagnets to effect reciprocating movement of the first workpiece support.

19 Claims, 5 Drawing Sheets

U.S. PATENT DOCUMENTS

| | | | |
|---|---|---|---|
| 5,788,791 A | 8/1998 | Grewell | 156/731 |
| 5,795,419 A * | 8/1998 | Lotz et al. | 156/64 |
| 5,798,599 A | 8/1998 | Harwood | 310/323 |
| 5,829,115 A | 11/1998 | Speller, Jr. et al. | 295/250 |
| 5,880,580 A | 3/1999 | Johansen | 323/282 |
| 6,118,095 A | 9/2000 | Nagano | 219/110 |
| 6,364,977 B1 * | 4/2002 | Simon | 156/64 |
| 6,450,393 B1 | 9/2002 | Doumanidis et al. | 228/110 |
| 6,491,785 B1 * | 12/2002 | Sato et al. | 156/379.6 |
| 6,517,652 B1 | 2/2003 | Gratz | 156/73.5 |
| 6,588,644 B2 | 7/2003 | Simon | 228/1.1 |
| 6,787,729 B2 | 9/2004 | Dugas et al. | 219/863 |
| 6,824,040 B2 * | 11/2004 | Honeck et al. | 228/110.1 |
| 6,828,522 B2 | 12/2004 | Hochhalter et al. | 219/863 |
| 6,836,057 B2 | 12/2004 | Hata | 310/328 |
| 6,891,183 B2 | 5/2005 | Kitamura et al. | 250/559 |
| 6,951,052 B2 | 10/2005 | Clew | 29/525 |
| 6,965,091 B2 | 11/2005 | Terada et al. | 219/121 |
| 6,984,921 B1 | 1/2006 | Kosterman | 310/323 |
| 7,002,095 B2 | 2/2006 | Kato et al. | 219/864 |
| 7,141,752 B2 | 11/2006 | Hochhalter et al. | 219/862 |
| 7,399,373 B2 | 7/2008 | Fernando | 156/73.1 |
| 7,449,084 B2 | 11/2008 | Nakakado | 156/580.1 |
| 7,520,308 B2 | 4/2009 | Siegler et al. | 156/359 |
| 2002/0038792 A1 | 4/2002 | Terada et al. | 219/121.6 |
| 2004/0069750 A1 | 4/2004 | Kato et al. | 219/86.1 |
| 2004/0241267 A1 | 12/2004 | Schultz | 425/193 |
| 2005/0077855 A1 | 4/2005 | Hochhalter et al. | 318/567 |
| 2006/0220599 A1 * | 10/2006 | Siegler et al. | 318/114 |
| 2007/0257087 A1 | 11/2007 | Klinstein et al. | 228/101 |
| 2007/0272723 A1 * | 11/2007 | Kimura et al. | 228/1.1 |

FOREIGN PATENT DOCUMENTS

| | | |
|---|---|---|
| DE | 4026711 | 2/1992 |
| EP | 0421019 | 4/1991 |

* cited by examiner

VIBRATION WELDING SYSTEM

FIELD OF THE INVENTION

This invention relates to vibration welding and particularly to an electronic drive system for vibration welding.

BACKGROUND

Linear vibration welders are used in the industry to weld two plastic parts, by creating linear oscillatory motion of one part relative to another part. As the parts are pressed together by force, the oscillatory motion generates heat, which melts the adjacent surfaces of the plastic parts and creates a weld after the parts cool.

The vibratory movement of one part relative to another part is generated by two electromagnets positioned between movable and stationary parts of the welder. Both electromagnets apply force along the same coordinate line, but in opposite directions. The electromagnets are energized with a 180° phase shift so that when the first electromagnet is energized, the second electromagnet is de-energized. Conversely, when the second electromagnet is energized, the first electromagnet is de-energized.

It is desirable to maintain the frequency of the energizing cycles at the resonant frequency of the movable mechanical part of the welder; to allow for maximum energy transfer to the parts being welded. It is also desirable to control the energy applied to the electromagnets, to maintain a desired level of the plastic melting during welding.

Previous methods to control the electromagnets achieve 180° phase shift between energizing/de-energizing cycles (see, e.g., U.S. Pat. No. 7,520,308), but they still have disadvantages. For example, when a three-phase output drive is used to control two electromagnets, two of the phases are used to drive the two electromagnets, and both electromagnets have a common wire connected to the third phase. The third phase is therefore loaded twice as much as either the first or second phase, which stresses the third phase control element (typically an IGBT transistor). Also, the overall timing of energizing and de-energizing is fixed, while PWM is used to control the amount of energy delivered to each electromagnet because a PWM controller is a standard drive solution in a three-phase motor control. But this has the disadvantage of having a slow response time, limited by the frequency of the PWM controller. In addition, use of the PWM controller for this application causes excessive switching of the output power elements (IGBT transistors), which in turn leads to unwanted power losses, excessive electrical noise and lower system reliability.

Previous methods of measuring the resonance frequency of the movable mechanical system involved a frequency sweep. In the sweep mode a fairly low voltage (typically 10%-25% of the maximum) was applied to the electromagnets and the frequency was stepped in small increments (typically 0.1 Hz) from the lowest to the highest frequency of the machine's operating range (typically from 200 Hz to 240 Hz). As the frequency was stepped, the amplitude feedback and/or the drive current output were monitored. The resonant frequency was determined as the one with highest amplitude feedback and/or lowest current output drive. Once the value of the resonant frequency was determined, it was stored in the memory of the control module (typically a Programmable Logic Controller or PLC) and passed on to the drive as its fixed operating frequency. This method of defining the resonant frequency was fairly accurate, but has several inherent shortcomings. Firstly, it required an operator to remember to go to a "Tuning" mode to sweep the frequency, which was frequently forgotten in the manufacturing environment. Secondly, the procedure itself was fairly time consuming and could take up to 3-5 minutes, which was also undesirable in the high volume production environment. Thirdly, the sweep routing did not address the issues of the machine and tooling warm up in high-volume and high-load types of applications. As the machine and its components get warmer, the resonant frequency goes down. If the new resonant frequency was not found, the machine would be running off its optimum mechanical resonance and therefore draw more current, producing more heat and inducing more stress on its critical components. An avalanche effect (or run away condition) could develop. To remedy this, the operator had to run frequency sweep every hour or so, which again compromised the manufacturing efficiency.

Previous methods to control the welding process were based on the use of a PLC. The linear position of the welded parts and the pressure between welded parts during welding were monitored and controlled by the PLC. Based on the information obtained from the sensors, the hydraulic cylinder lifting the table and engaging welded parts was controlled by the PLC. While the PLC had all the necessary input/output channels to provide such control, its response time was fairly slow (typically from 5 ms to 20 ms), which could affect repeatability and accuracy of the welding process.

BRIEF SUMMARY

The present disclosure provides a vibration welding system for welding first and second workpieces by effecting reciprocating movement of the first workpiece relative to the second workpiece while urging the workpieces together. The vibration welding system includes first and second workpiece supports, with the first workpiece support mounted for reciprocating movement relative to the second workpiece support. A pair of electromagnets are coupled to the first workpiece support for effecting reciprocating movement of the first workpiece support, and an electrical drive system is coupled to the electromagnets for successively energizing and de-energizing the electromagnets out of phase with each other to effect the reciprocating movement of the first workpiece support. The drive system includes a source of DC current; multiple controllable electronic switching devices for controllably coupling the source to, and de-coupling the source from, each of the electromagnets; current sensors coupled to the electromagnets and producing signals representing the currents supplied to the electromagnets; and control circuitry coupled to the electronic switching devices and receiving the signals produced by the current sensors for turning the switching devices on and off to control the energizing and de-energizing of the electromagnets to effect reciprocating movement of the first workpiece support.

In one embodiment, the first workpiece support is part of a movable mechanical system that has a resonant frequency of vibration, the control circuitry is programmed to maintain a preselected time period for each successive cycle of energizing and de-energizing each of the electromagnets, and the preselected time period corresponds to the resonant frequency of the movable mechanical system.

In one implementation, the control circuitry is configured to compare the signals produced by the current sensors with a preset current level and to control the currents supplied to the electromagnets and thereby control the amount of energy supplied to the electromagnets and thus to the workpieces.

In one implementation, the second workpiece is engaged by means of a hydraulic drive activated by the control circuitry. Pressure between the engaged first and second workpieces, as well as the linear position of the second workpiece, are monitored by the control circuitry.

BRIEF DESCRIPTION OF THE DRAWINGS

The invention may best be understood by reference to the following description taken in conjunction with the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
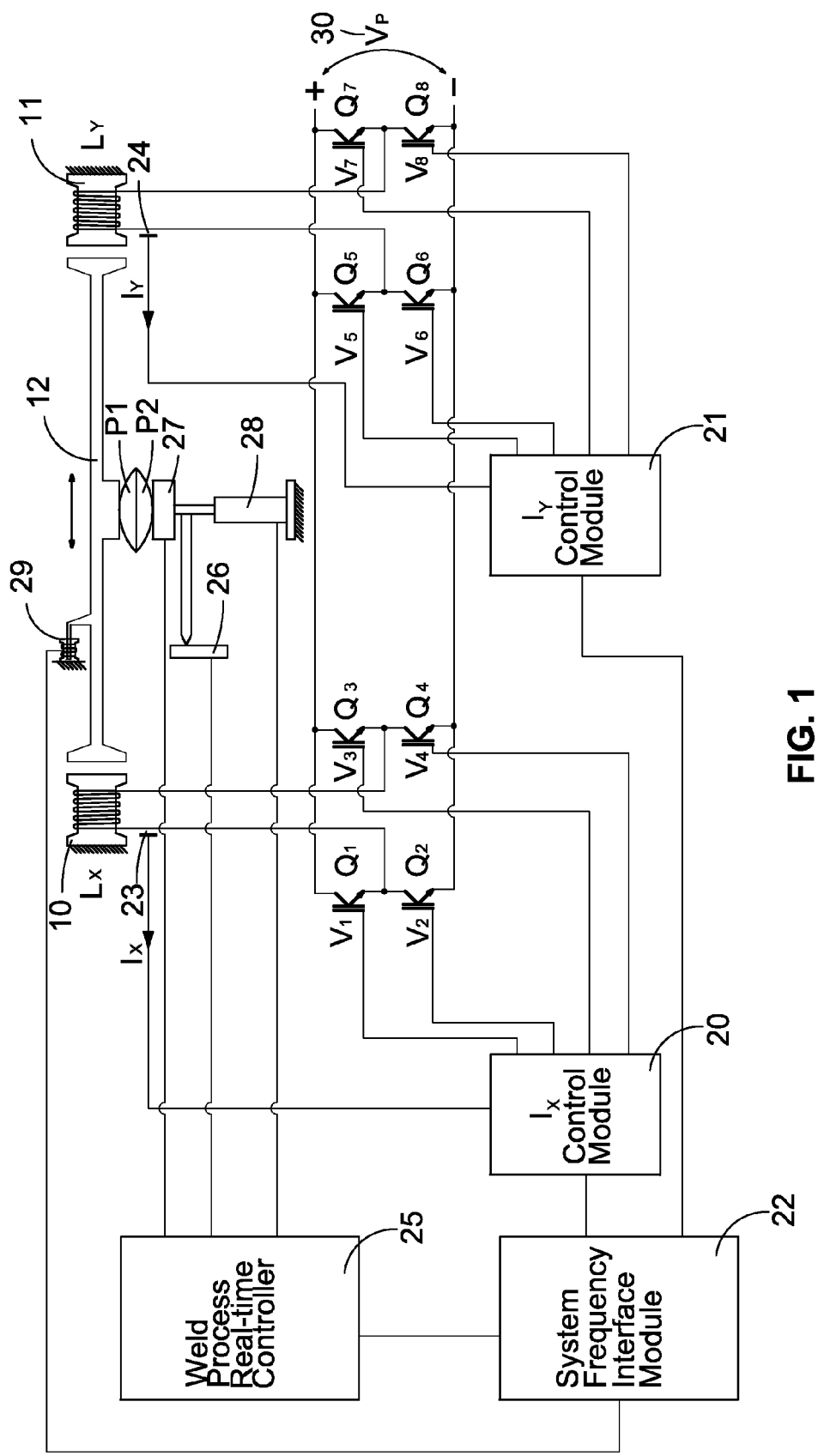
FIG. 1 is a schematic diagram of an electrical control system for a vibration welder.

FIG. 1 illustrates a linear vibration welder that includes two stationary electromagnets $L_x$ and $L_y$ (e.g., attached to a stationary frame) having rotors 10 and 11 at opposite ends of a moving element 12 that carries a plastic part $P_1$. As the electromagnet $L_x$ is energized, the moving element 12 of the welder is moved to the left (as viewed in FIG. 1), and as the electromagnet $L_y$ is energized, the moving element 12 is moved to the right. The two electromagnets $L_x$ and $L_y$ are energized and de-energized sequentially, with a 180° phase shift, to cause vibration of the moving element 12 and the plastic part $P_1$ that is firmly attached to the moving element 12. As the plastic part $P_1$ is vibrated, it is pressed against a stationary plastic part $P_2$ by the hydraulic cylinder 28, so that the oscillatory motion of the vibrating plastic part $P_1$ relative to the stationary plastic part $P_2$ generates heat that causes the engaging surfaces of both plastic parts to melt, so that the two parts weld together as vibration is halted.

Electrical current is supplied to the coils of the two electromagnets $L_x$ and $L_y$ from a power source $V_p$ that supplies DC current to the $L_x$ coil via four IGBT's Q1-Q4, and to the $L_y$ coil via four IGBT's Q5-Q8. The two sets of four IGBT's Q1-Q4 and Q5-Q8 form a two-phase drive system for the corresponding $L_x$ and $L_y$ coils, forming an overall synchronized four-phase drive system for the two coils. The first phase includes IGBT's Q1 and Q2, the second phase IGBT's Q3 and Q4, the third phase IGBT's Q5 and Q6, and the fourth phase IGBT's Q7 and Q8. The electromagnet $L_x$ is powered by the first and second phases, while the electromagnet $L_y$ is powered by the third and fourth phases. All four phases are electrically identical except that the first and third phases are 180° out of phase with the second and fourth phases, as will be discussed in more detail below.

The switching of the IGBT's Q1-Q8 is controlled by a pair of $I_x$ and $I_y$ control modules 20 and 21 and a system frequency interface module 22 that control when the IGBT's Q1-Q8 are turned on and off. Specifically, the control module 20 generates four gate voltages V1, V2, V3, V4 for the IGBT's Q1-Q4, respectively, and the control module 21 generates four gate voltages V5, V6, V7, V9 for the IGBT's Q5-Q8, respectively. Each of the control modules 20 and 21 implements direct feed-forward current control, using an input signal from one of a pair of current sensors 23 and 24 that produce signals representing the actual currents in the respective $L_x$ and $L_y$ coils. Both modules also use a preselected current value $I_{set}$ that represents the maximum current to be supplied to each of the $L_x$ and $L_y$ coils, and a preselected time period $T_{set}$ that represents the frequency at which each coil is repetitively energized and de-energized. The preselected current value $I_{set}$ effectively controls the amount of energy supplied to the $L_x$ and $L_y$ coils, to maintain the desired level of melting of the engaged surfaces of the plastic parts $P_1$ and $P_2$ during the vibration welding of those parts. The preselected time period $T_{set}$ effectively controls the period of each cycle of successive energizing and de-energizing of the electromagnets $L_x$ and $L_y$, to match the resonant frequency of the mechanical portions of the vibration welder so that maximum energy is transferred to the plastic parts $P_1$ and $P_2$ during the vibration welding of those parts.

Figure 2:
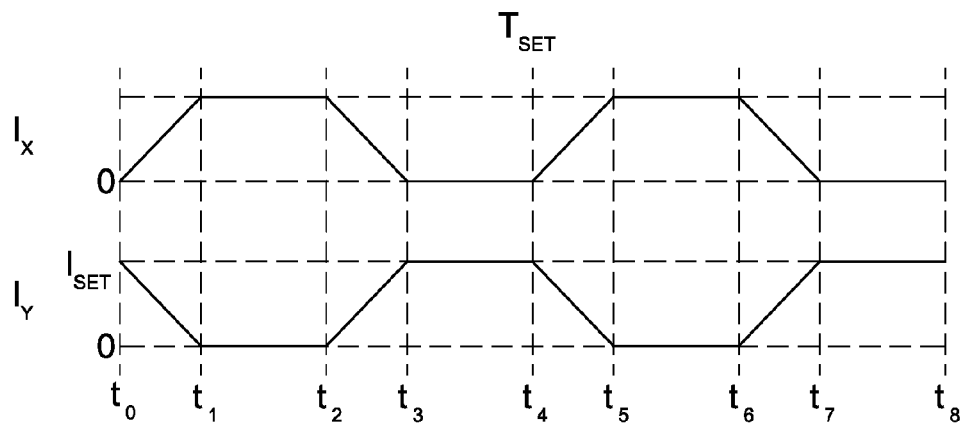
FIG. 2 is a timing diagram of the energizing currents supplied by the electrical control system of FIG. 1 to the two driving electromagnets in the vibration welder.

The current flowing through the $L_x$ coil is monitored by the current sensor 23, which produces an output signal $I_x$ representing the instantaneous magnitude of that current. Similarly, the current flowing through the $L_y$ coil is monitored by the current sensor 24, which produces an output signal $I_y$ representing the instantaneous magnitude of that current. The control modules 20 and 21 compare the signals $I_x$ and $I_y$, respectively, with the preset value $I_{set}$. FIG. 2 is a timing diagram illustrating how the signals $I_x$ and $I_y$ are used by the module 20 to generate the control signals that turn the IGBT's Q1-Q4 on and off.

Figure 5A:
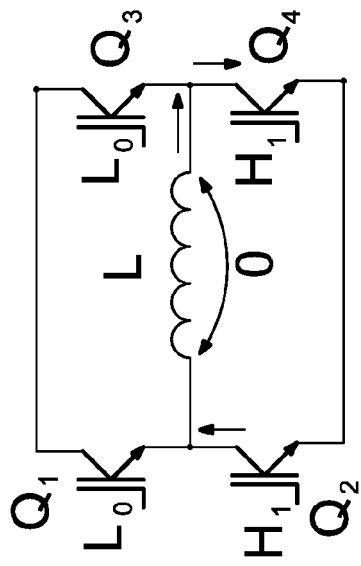
FIGS. 5A-5D are electrical schematic diagrams of the four IGBT's associated with one of the electromagnets in the vibration welder, and illustrating the current flow through those IGBT's during one cycle of one of the electrical currents in the timing diagram of FIG. 2.

In FIG. 2, the upper diagram represents the current flow in the $L_x$ coil, and the lower diagram represents the current flow in the $L_y$ coil. One complete cycle extends from time $t_0$ to time $t_4$. In this illustrative example, energizing of the $L_x$ coil begins at time $t_0$, when the control module 20 generates control signals that turn on the IGBT Q1 and turn off the IGBT Q2. The IGBT Q3 remains off and the IGBT Q4 remains on from the previous cycle. As illustrated in FIG. 5A, this combination of states for the four IGBT's Q1-Q4 causes current to flow through the $L_x$ coil from the source $+V_p$, increasing from zero at time $t_0$ to the preselected value $I_{set}$ at time $t_1$. The length of the time interval between $t_0$ and $t_1$ is determined by when $I_x$ reaches the level $I_{set}$, which is detected in the control module 20 by continually comparing $I_x$ with the preselected value $I_{set}$.

Figure 5B:
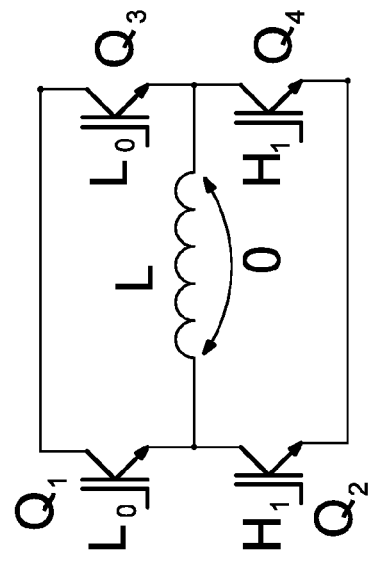

When $I_x$ reaches $I_{set}$ at time $t_1$, the control module 20 generates control signals that turn off the IGBT Q1 and turn on the IGBT Q2, so that the current level in the $L_x$ coil cannot be increased any farther. The IGBT Q3 remains off, and the IGBT Q4 remains on. As illustrated in FIG. 5B, this combination of states for the four IGBT's Q1-Q4 reduces the voltage applied to the $L_x$ coil to zero and causes the current in the $L_x$ coil to continue to flow through the $L_x$ coil via the IGBT's Q2 and Q4, at the level of $I_{set}$, until time $t_2$.

Figure 5C:
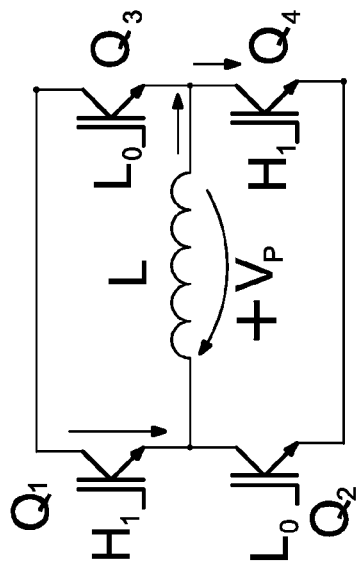

The length of the time interval between $t_1$ and $t_2$ is determined by the preselected value $½T_{set}$ stored in a memory in the module 22, which also includes a microprocessor that measures the elapsed time following $t_0$. When that elapsed time equals $½T_{set}$, the microprocessor generates control signals that turn on the IGBT Q3 and turn off the IGBT Q4. The IGBT Q1 remains off, and the IGBT Q2 remains on. As illustrated in FIG. 5C, this combination of states for the four IGBT's Q1-Q4 applies a reversed voltage $-V_p$ to the $L_x$ coil, which causes current to flow through the $L_x$ coil from the source $-V_p$, via the IGBT's Q3 and Q2, decreasing from $I_{set}$ at time $t_2$ to zero, at time $t_3$. The length of the time interval between $t_2$ and $t_3$ is determined by when $I_x$ reaches zero, which is detected in the control module 20 by continually comparing $I_x$ with a zero reference value.

Figure 5D:
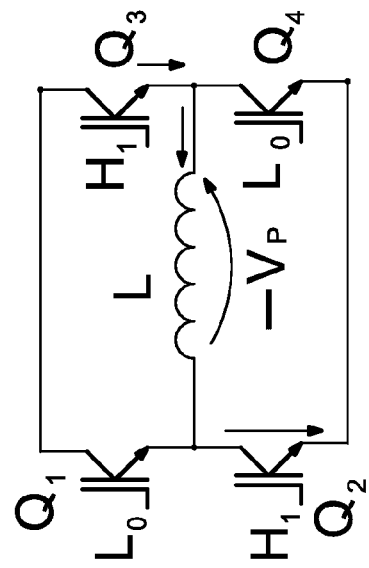

When $I_x$ reaches zero, the control module 20 generates control signals that turn off the IGBT Q3 and turn on the IGBT Q4, at time $t_3$, to maintain the zero-current condition in the $L_x$ coil. The IGBT Q1 remains off, and the IGBT Q2 remains on. As illustrated in FIG. 5D, this combination of states for the four IGBT's Q1-Q4 reduces the voltage applied to the $L_x$ coil to zero and maintains the zero-current condition in the $L_x$ coil until time $t_4$, which is when the next cycle begins.

Figure 3:
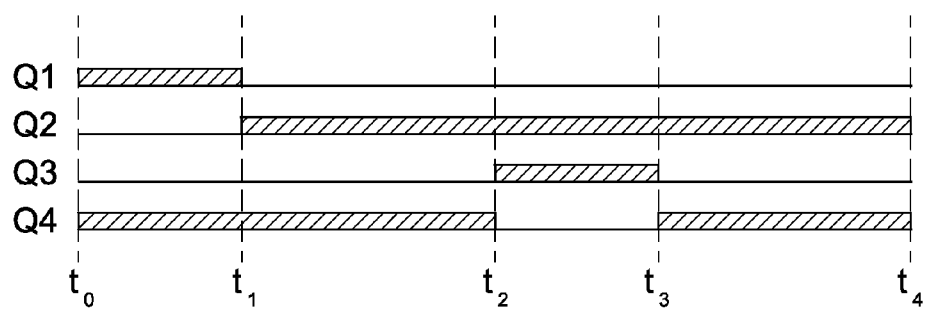
FIG. 3 is a timing diagram of the control signals supplied by the electrical control system of FIG. 1 to the four insulated-gate bipolar transistors (IGBT's) associated with one of the electromagnets in the vibration welder.

As can be seen in FIGS. 2 and 3, the length of the time interval between $t_2$ and $t_3$ is approximately the same as the time interval between $t_0$ and $t_1$, because the change in current is the same in both intervals, i.e., the difference between $I_{set}$ and zero. The length of the time interval between $t_3$ and $t_4$ is determined by the preselected value $T_{set}$ stored in a memory in the module 22, which also includes a microprocessor that measures the elapsed time following $t_0$. When that elapsed time equals $T_{set}$, the microprocessor generates control signals that turn on the IGBT Q1 and turn off the IGBT Q3 to begin the next cycle.

The lower diagram in FIG. 2 represents the current flow in the $L_y$ coil. One complete cycle extends from time $t_0$ to time $t_4$. In this illustrative example, de-energizing of the $L_y$ coil begins at time $t_0$, when the control module 20 generates control signals that turn on the IGBT Q7 and turn off the IGBT Q8. The IGBT Q5 remains off, and the IGBT Q6 remains on from the previous cycle. This combination of states for the four IGBT's Q5-Q8 applies a reversed voltage $-V_p$ to the $L_y$ coil, which causes the current flowing through the $L_y$ coil, via the IGBT's Q6 and Q7, to decrease.

When the current in the $L_y$ coil decreases to zero, which is detected in the control module 20 by continually comparing $I_y$ with the zero reference value, the control module generates control signals that turn off the IGBT Q7 and turn on the IGBT Q8 at time $t_1$. The IGBT Q5 remains off, and the IGBT Q6 remains on. This combination of states for the four IGBT's Q5-Q8 reduces the voltage applied to the $L_y$ coil to zero and maintains the zero-current condition in the $L_y$ coil until time $t_2$.

The length of the time interval between $t_1$ and $t_2$ is determined by the preselected value $½T_{set}$ stored in a memory in the module 22, which also includes a microprocessor that measures the elapsed time following $t_0$. When that elapsed time equals $½T_{set}$, the microprocessor generates control signals that turn on the IGBT Q5 and turn off the IGBT Q6. The IGBT Q7 remains off, and the IGBT Q8 remains on. This combination of states for the four IGBT's Q5-Q8 applies a voltage $+V_p$ to the $L_y$ coil, which causes the current flowing through the $L_y$ coil, via the IGBT's Q5 and Q8, to increase from zero at time $t_2$ to $I_{set}$ at time $t_3$. The length of the time interval between $t_2$ and $t_3$ is determined by when $I_y$ reaches the level $I_{set}$, which is detected in the control module 20 by continually comparing $I_y$ with the preselected value $I_{set}$.

When $I_y$ reaches $I_{set}$ at time $t_3$, the control module generates control signals that turn off the IGBT Q7 and turn on the IGBT Q8, so that the current level in the $L_y$ coil cannot be increased any farther. The IGBT Q5 remains off, and the IGBT Q6 remains on. This combination of states for the four IGBT's Q5-Q8 causes the current in the $L_y$ coil to continue to flow through the $L_y$ coil via the IGBT's Q6 and Q8, at the level of $I_{set}$, until time $t_4$.

The length of the time interval between $t_3$ and $t_4$ is determined by the preselected value $T_{set}$ stored in a memory in the module 22, which also includes a microprocessor that measures the elapsed time following $t_0$. When that elapsed time equals $T_{set}$, the microprocessor generates control signals that turn on the IGBT Q5 and turn off the IGBT Q6 to begin the next cycle.

FIG. 3 is an enlarged timing diagram of one period of the drive current supplied to the coil of one of the electromagnets 10 or 11. The drive currents supplied to the two electromagnets are identical, except that they are 180° out of phase with each other.

The voltage V across each of the $L_x$ and $L_y$ coils can be expressed as:

$$V = iR + L\frac{di}{dt} \quad (1)$$

where
V is the voltage across the electromagnet coil,
R is the equivalent series resistance of the electromagnet coil,
L is the equivalent inductance of the electromagnet coil, and
i is the current in the electromagnet coil.

Because of the large physical size of the electromagnet, the equivalent series resistance of either the $L_x$ coil or the $L_y$ coil can be considered negligibly small in comparison with the equivalent inductance of that coil. Thus, equation (1) can be approximated as:

$$V = L\frac{di}{dt} \quad (2)$$

Replacing di with $\Delta i$ and replacing dt with $\Delta t$, and then solving for $\Delta i$, yields:

$$\Delta i = \frac{V}{L}\Delta t \text{ or } \Delta t = \frac{L}{V}\Delta i \quad (3)$$

According to equation (3), the time interval between $t_0$ and $t_1$ is determined by the current through the $L_x$ coil linearly increases by $\Delta i = (I_{set} - 0)$, the voltage $V_p$, and the inductance of the $L_x$ coil. From equation (3), IF v=0, then $\Delta i = 0$. Thus, current through the coil does not change, remaining at a substantially constant value as long as V=0.

Figure 4:
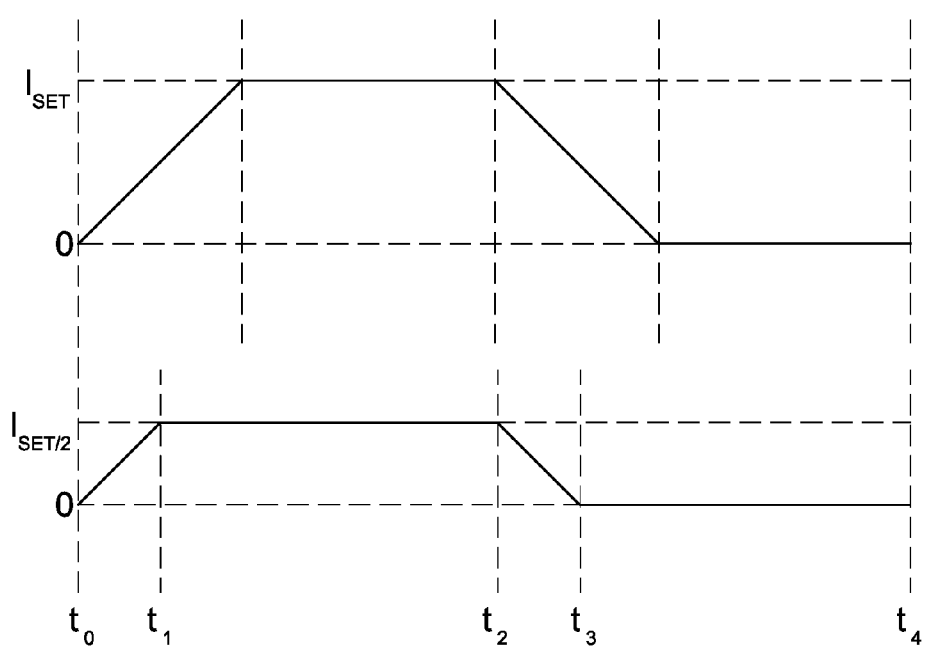
FIG. 4 is a timing diagram corresponding to the first cycle of the upper line of FIG. 2 but with a different set point for the maximum value of the electrical current supplied to the electromagnets in the vibration welder.

It can be seen that the period of the cycle is precisely defined by the time interval $T_{set}$ between $t_0$ and $t_4$, while the shape of the current waveform is defined by the feed forward current control, defined by the $I_{set}$ value. For example, FIG. 4 shows the shapes of the current waveforms for $I_{set}$ and $½T_{set}$.

For $\frac{1}{2}T_{set}$, the time intervals ($t_0$-$t_1$) and ($t_2$-$t_3$) decrease to about ½ of those same intervals in FIGS. 2 and 3, while the overall period $T_{set}$ remains the same because the intervals ($t_1$-$t_2$) and ($t_3$-$t_4$) increase.

Figure 6:
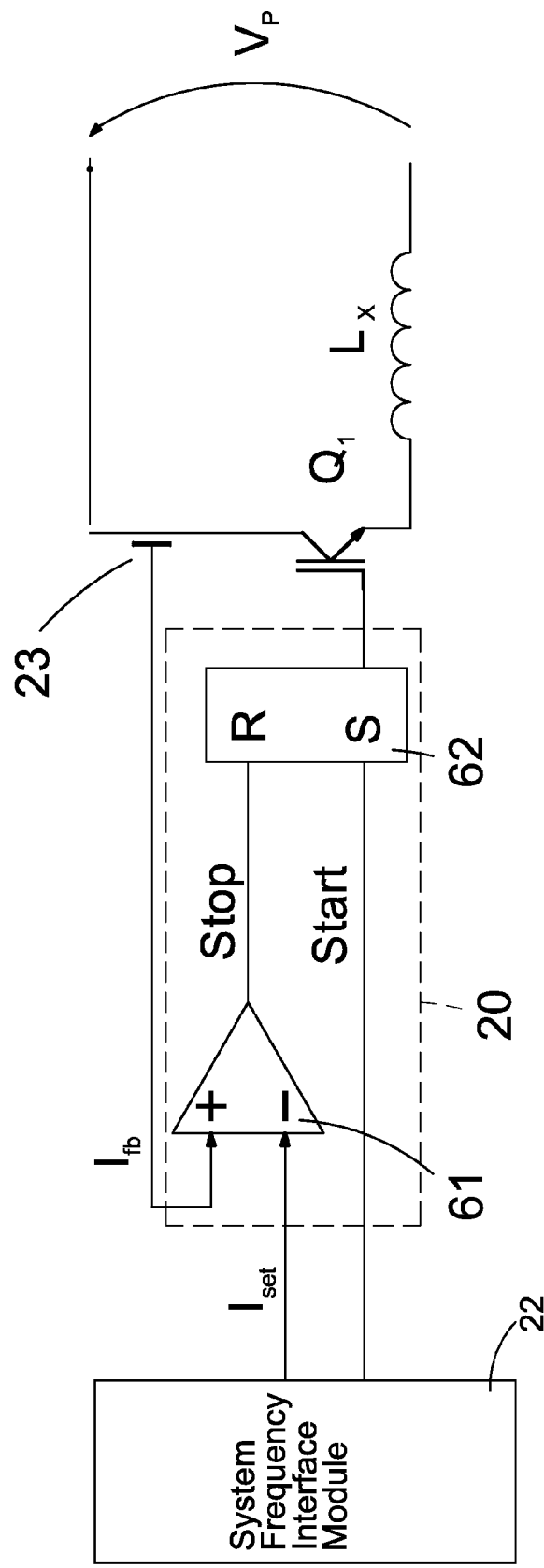
FIG. 6 is an electrical schematic diagram of one embodiment of electrical circuitry included in the control modules in the electrical control system of FIG. 1, for controlling one of the IGBT's.

The illustrated system provides a symmetrical four-phase drive in which each control element is equally loaded, and no control element is electrically stressed more than another control element. The timing diagram of the electromagnet control varies as a function of the required energy level, while the overall frequency of the energizing and de-energizing cycles is maintained at a set frequency level. The IGBT control modules 20 and 21 implement a direct feed-forward current control, which provides fast, direct and dynamically accurate control of the current supplied to the electromagnets, which in turn allows accurate delivery of welding energy to the workpieces. The structure of the feed-forward control for one IGBT is shown in FIG. 6.

At the beginning of each stage, the signal START sets the output of a flip-flop 62 to a high voltage level. The IGBT Q1 switches into conduction, and the current in the $L_x$ coil gradually increases. When the current reaches $I_{fb}$, a comparator 61 resets the flip-flop (signal STOP), which turns off the IGBT Q1. This configuration allows the setting of a desired current value $I_{set}$ directly within each charge-discharge period.

The second stationary plastic part $P_2$ of FIG. 1 is engaged by the hydraulic cylinder 28, controlled by a weld process real-time controller 25, which repeatedly samples values from a linear position sensor 26 and a pressure sensor 27. The sampled value from the linear position sensor 26 indicates the position of the plastic part $P_2$ relative to the plastic part $P_1$. The sampled value from the pressure sensor 27 indicates the pressure between the plastic parts $P_1$ and $P_2$. As this pressure reaches the set point, the welding process starts.

The sampled values from the pressure and linear position sensors may be used by the drive's internal real-time control circuitry to precisely monitor the pressure between two engaged parts, and the position of the second workpiece, for controlling the drive's position and pressure. The response time of the internal real-time control circuitry is very short (typically 5 us to 50 us), thus significantly improving the repeatability and accuracy of the welding process.

The system illustrated in FIG. 1 also includes a vibration sensor 29, which may be an inductive sensor or any other sensor detecting vibration of the moving element 12. The moving part of the sensor 29 is firmly linked with the moving element 12 so that the AC EMF in the coil of the sensor 29 reflects the amplitude and frequency of the movement of the element 12. The output of the sensor 29 is sampled by the system frequency interface module 22, which in turn defines the value $T_{set}$, passed to the control modules 20 and 21.

The illustrative system also permits power profiling of the welding operation, by controlling the actual amount of power applied to the weld joint throughout a welding cycle. This permits accurate control of both the welding process and the quality of the weld joint. The power P applied to the weld joint is a function of both the voltage V and the current I supplied to the coils $L_x$ and $L_y$, i.e., P=V*I. The current I is controlled by the value of the $I_{set}$ described above, and this value can be changed throughout a weld cycle, according to a preset profile. The voltage applied to the coils $L_x$ and $L_y$ is controlled by the value of the voltage $V_p$ supplied to the drive system, and this value can also be changed throughout a weld cycle according to a preset profile, by using a closed-loop voltage control system like the closed-loop current control system shown in FIG. 6. By controlling the current I and/or the voltage V, the power delivered to the weld joint can be precisely controlled throughout each weld cycle to achieve a desired power profile. Alternatively, a desired power profile can be achieved by adjusting the force applied to the workpieces by the hydraulic cylinder 28 to achieve the changes in P=V*I required to follow a preset power profile.

The Q factor of a welder is a function of the quality of its springs, coils, lamination carriers, drive and the actual upper tooling. While springs, coils, lamination carriers and drives have fairly good repeatability and tight tolerances (since they are standard components shared among the machines), the upper tooling is unique to every part being welded. Therefore, the quality of the tooling design and manufacturing can have a significant effect on the overall welder performance. A typical value of the Q factor for a vibration welder is between 100 and 160. The higher value indicates a better built system that runs more efficiently with fewer losses and is more reliable. This value is measured and stored in the machine controller during the factory testing. As the machine ages, the Q is monitored and compared to the original value. Its decrease can serve as an early warning of the tool or machine deterioration. It is also valuable for troubleshooting purposes. A user may set limits around the Q value to warn of such occurrences. If a user changes the tool, a new Q value is calculated. This feature can also be used as a quantative measure of the tool quality, once the new tool is tested.

Figure 7:
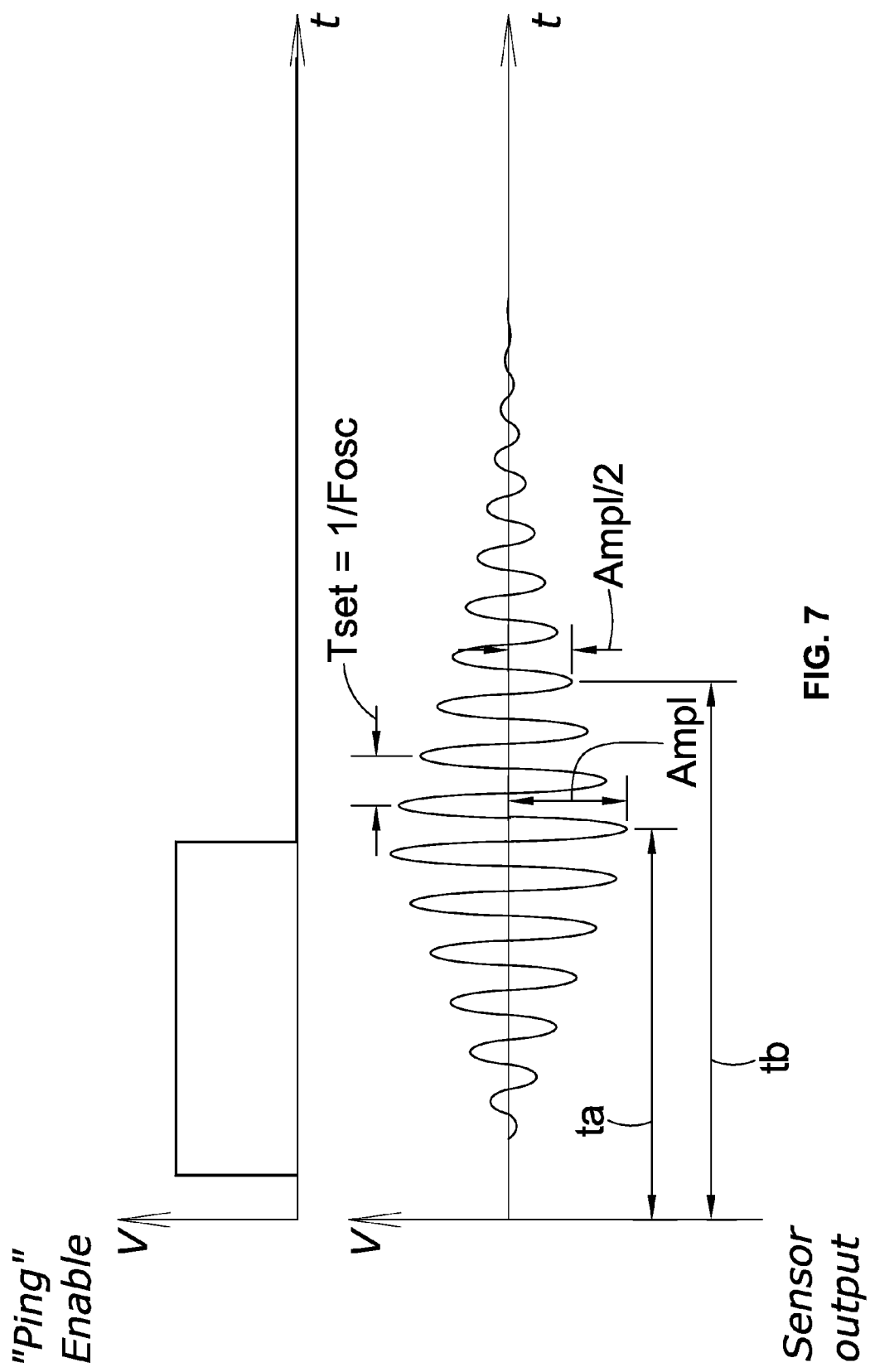
FIG. 7 is a timing diagram of a waveform illustrating a "ping" mode of operation of the system of FIGS. 1-6

To determine the resonant frequency of the mechanical part, the system frequency interface module 22 in FIG. 1 uses a "ping" method, which begins when the system frequency interface module 22 generates a "ping" enable pulse (see FIG. 7). The "ping" enable pulse enables the control modules 20 and 21 to activate the coils X and Y at a preselected initial frequency for a short period of time (typically between 50 ms and 200 ms, which corresponds to about 10 to 40 cycles of the operating frequency). The control modules 20 and 21 are then disabled. The mechanical part continues damped oscillations at its resonant frequency, similarly to an acoustic tuning fork. The frequency $F_{osc}$ of the oscillations is measured by the system frequency interface module 22, by sampling the output of the inductive sensor 29. Measurement is done over multiple cycles to average multiple periods and therefore provide high measurement accuracy. This frequency $F_{osc}$ is then used in the next "ping" cycle.

The "ping" frequency measurement is executed between the weld cycles so that it does not affect the throughput of the welder. The measured resonant frequencies $F_{osc}$ are stored in the memory of the system frequency interface module 22, and a trend report is generated. The report is utilized to track the frequency fluctuations caused by temperature changes or other factors. In addition, after each measurement, the new period $T_{set}$ is calculated as:

$$T_{set}=1/F_{osc} \qquad (4)$$

and passed to the control modules 20 and 21.

The Q factor of the movable mechanical system is measured as:

$$Q=F_{osc}(t_b-t_a) \qquad (5)$$

where:
Q—system Q (quality) factor
$t_a$—time at the maximum amplitude after the "ping" signal is over (FIG. 7)
$t_b$—time, when the amplitude declines in half (FIG. 7)
$F_{osc}$—measured frequency While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A vibration welding system for welding first and second workpieces by effecting reciprocating movement of the first workpiece relative to the second workpiece while urging the workpieces together, said vibration welding system comprising first and second workpiece supports, said first workpiece support being mounted for linear reciprocating movement relative to said second workpiece support, a pair of electromagnets coupled to said first workpiece support for effecting linear reciprocating movement of said first workpiece support, each of said electromagnets including a drive coil and an electrical drive system including a pair of two-phase drive systems each of which is coupled to one of said drive coils for successively energizing and de-energizing said electromagnets 180 degrees out of phase with each other to effect said linear reciprocating movement of said first workpiece support, each of said two-phase drive systems including a source of DC current, multiple controllable electronic switching devices for controllably coupling said source to, and de-coupling said source from, each of said electromagnets, first and second of said controllable electronic switching devices being connected between said source of DC current and a first end of the drive coil, and third and fourth of said controllable electronic switching devices being connected between said source of DC current and a second end of the drive coil, current sensors coupled to said electromagnets and producing signals representing the currents supplied to said electromagnets, and control circuitry coupled to said electronic switching devices and receiving the signals produced by said current sensors for turning said switching devices on and off to control the energizing and de-energizing of said electromagnets to effect reciprocating movement of said first workpiece support, said control circuitry controlling said first, second, third and fourth switching devices to increase the current supplied to the associated drive coil to a preset level and to maintain that current at said preset level for a first preset time interval, and to then reduce that current to zero and to maintain the zero level for a second preset time interval, the current supplied to the drive coil of the first electromagnet being 180 degrees out of phase with the current supplied to the drive coil of the second electromagnet.

2. The vibration welding system of claim 1 in which said first workpiece support is part of a movable mechanical system that has a resonant frequency of vibration, said control circuitry is programmed to maintain a preselected time period for each successive cycle of energizing and de-energizing each of said electromagnets, and said preselected time period corresponds to said resonant frequency of said movable mechanical system.

3. The vibration welding system of claim 2 in which said preselected time period is the reciprocal of said resonant frequency.

4. The vibration welding system of claim 1 in which said control circuitry is configured to compare said signals produced by said current sensors with a preset current level and to control the currents supplied to said electromagnets and thereby control the amount of energy supplied to said electromagnets and thus to said workpieces.

5. The vibration welding system of claim 4 in which said control circuitry is configured to increase the current supplied to each electromagnet until a preset current level $I_{set}$ is detected.

6. The vibration welding system of claim 4 in which said preset current level is adjusted during a welding cycle to adjust the amount of energy supplied to said electromagnets and thus to said workpieces to follow a preset power profile for the amount of energy delivered to said workpieces during said welding cycle.

7. The vibration welding system of claim 6 in which the voltage across said electromagnets during a welding cycle is controlled to adjust the amount of energy supplied to said electromagnets and thus to said workpieces to follow a preset power profile for the amount of energy delivered to said workpieces during said welding cycle.

8. The vibration welding system of claim 6 in which the current I and voltage V supplied to said electromagnets are controlled during a welding cycle to supply said workpieces with a power $P=V*I$ that follows a preset profile for the amount of Power P delivered to said workpieces during said welding cycle.

9. The vibration welding system of claim 1 in which said electronic switching devices are power semiconductor devices.

10. The vibration welding system of claim 9 in which said power semiconductor devices are insulated-gate bipolar transistors.

11. The vibration welding system of claim 1 which includes a sensor for monitoring the pressure between said first and second workpieces, and the linear position of said second workpiece.

12. The vibration welding system of claim 1 which includes a hydraulic cylinder urging said two workpieces together, a pressure sensor detecting the pressure between said workpieces, and movement of said hydraulic cylinder started is initiated in response to the detection of a preselected pressure by said pressure sensor.

13. The vibration welding system of claim 1 in which said electronic switching devices are substantially equally loaded and substantially equally stressed by switching.

14. The vibration welding system of claim 1 which includes a vibration sensor detecting vibration of the mechanical portion of the vibration welding system and producing an output signal for use in measuring the resonant frequency of said mechanical portion, and said control circuitry is adapted to determine the Q factor of said vibration welding system.

15. The vibration welding system of claim 14 in which said control circuitry is adapted to maintain a preselected time period for each successive cycle of energizing and de-energizing each of said electromagnets, said preselected time period corresponding to said resonant frequency of said movable mechanical system.

16. The vibration welding system of claim 15 in which said control circuitry is adapted to compare said Q factor of said vibration welding system with set limits for evaluating or troubleshooting said movable mechanical system.

17. The vibration welding method of claim 14 in which said control circuitry is adapted to determine the Q factor of said vibration welding system by pinging said movable mechanical system with an oscillating signal and then measuring the frequency of said system during ring-down following the termination of said oscillating signal and the time period between the termination of said oscillating signal and the time when the amplitude of said ring-down drops to half its initial value.

18. The vibration welding system of claim 1 in which each of said electromagnets includes a drive coil, and
said electrical drive system includes a two-phase drive system for the drive coil of each electromagnet, each two-phase drive system including
first and second of said controllable electronic switching devices being connected between said source of DC current and a first end of the drive coil, and third and fourth of said controllable electronic switching devices being connected between said source of DC current and a second end of the drive coil, and
said control circuitry coupled to said first, second, third and fourth switching devices supplies the drive coil with current by repetitively
turning on the first and fourth switching devices and turning off the second and third switching devices to supply the drive coil with a current that increases to a preset level,
then turning off the first and third switching devices and turning on the second and fourth switching devices to maintain the current supplied to the drive coil at said preset level for a preset time interval,
then turning off the first and fourth switching devices and turning on the second and third switching devices to reduce the current supplied to the drive coil to zero, and
then turning off the first and third switching devices and turning on the second and fourth switching devices to maintain the zero current level for a preset time interval.

19. The vibration welding system of claim 18 in which said preset current level controls the amount of energy supplied to the drive coil.

\* \* \* \* \*